United States Patent
Schoeny et al.

(10) Patent No.: US 10,206,325 B2
(45) Date of Patent: Feb. 19, 2019

(54) MULTIPLE SEED TYPE SEED METER WITH SEED SWITCHING MECHANISM

(71) Applicant: CNH Industrial America LLC, New Holland, PA (US)

(72) Inventors: Christopher Schoeny, Yorkville, IL (US); Chad M. Johnson, Arlington Heights, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 33 days.

(21) Appl. No.: 15/426,430

(22) Filed: Feb. 7, 2017

(65) Prior Publication Data

US 2018/0220579 A1 Aug. 9, 2018

(51) Int. Cl.
   *A01C 7/04* (2006.01)
   *A01C 21/00* (2006.01)
   *A01C 7/10* (2006.01)
   *A01C 7/20* (2006.01)

(52) U.S. Cl.
   CPC ............ *A01C 7/046* (2013.01); *A01C 7/10* (2013.01); *A01C 7/20* (2013.01); *A01C 21/005* (2013.01)

(58) Field of Classification Search
   CPC .... A01C 7/04; A01C 5/06; A01C 7/08; A01C 7/042; A01C 7/044; A01C 7/046; A01C 21/005; A01C 7/10; A01C 7/20
   USPC ........................................................ 111/183
   See application file for complete search history.

(56) References Cited

U.S. PATENT DOCUMENTS

| | | | |
|---|---|---|---|
| 3,552,601 A | 1/1971 | Cordova et al. | |
| 5,058,766 A | 10/1991 | Deckler | |
| 5,915,313 A | 6/1999 | Bender et al. | |
| 6,352,042 B1 | 3/2002 | Martin et al. | |
| 6,607,094 B2 | 8/2003 | MacDonald | |
| 6,845,724 B2 | 1/2005 | Mayerle et al. | |
| 7,798,080 B2 | 9/2010 | Sauder et al. | |
| 8,511,242 B2 | 8/2013 | Applegate et al. | |
| 8,942,894 B2 | 1/2015 | Garner et al. | |
| 9,148,992 B2 | 10/2015 | Staeter | |
| 9,360,121 B2 | 6/2016 | Garner et al. | |
| 9,936,625 B2 * | 4/2018 | Wendte | A01C 7/105 |
| 2011/0098851 A1* | 4/2011 | Glendenning | A01C 7/046 700/240 |
| 2014/0165890 A1* | 6/2014 | Graham | A01C 7/04 111/170 |
| 2015/0059627 A1 | 3/2015 | Kinzenbaw et al. | |

(Continued)

OTHER PUBLICATIONS

Planter of the Future: Multiple H:ybrids and Speed; www.agriculture.com/machinery/farm-implements/planters/plter-of-future-multiple-hybrids_231-ar41807; 8 pages; author, Jessie Scott; Feb. 10, 2014.

*Primary Examiner* — Alicia Torres
(74) *Attorney, Agent, or Firm* — Rebecca L. Henkel; Rickard K. DeMille

(57) ABSTRACT

A multiple seed type seed meter is provided for multi-variety row crop planting. The seed meter maintains multiple seed pools inside a seed meter sump while controlling which of the seed pools is exposed to a seed disk inside the seed meter for selective delivery onto a field. The sump may define a split sump arrangement and a seed switching mechanism may be arranged between the split sump arrangement and the seed disk for selectively exposing ones of multiple seed pools with different seed types to the seed disk.

16 Claims, 13 Drawing Sheets

(56) References Cited

U.S. PATENT DOCUMENTS

| | | |
|---|---|---|
| 2015/0223390 A1* | 8/2015 | Wendte .................... A01C 7/04 |
| | | 111/177 |
| 2015/0319916 A1 | 11/2015 | Garner et al. |
| 2015/0351314 A1* | 12/2015 | Sauder .................... A01C 7/046 |
| | | 700/275 |
| 2015/0351315 A1 | 12/2015 | Wendte et al. |
| 2016/0037713 A1 | 2/2016 | Wendte et al. |
| 2016/0143212 A1* | 5/2016 | Wendte ................ A01C 21/005 |
| | | 111/183 |
| 2016/0165794 A1 | 6/2016 | Czapka et al. |

* cited by examiner

MULTIPLE SEED TYPE SEED METER WITH SEED SWITCHING MECHANISM

FIELD OF THE INVENTION

The invention relates generally to planters and, in particular, to planters for planting multiple types or varieties of seed and a seed meter with a seed switching mechanism.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. To reduce operating expenses, farm equipment is operated at relatively faster travel speeds, which reduce the amount of operating time to complete certain tasks. When operating equipment at faster travel speeds, it can be important to maintain the quality of operation and good agronomic characteristics that can be achieved while operating at relatively slower operating speeds. This can be especially difficult to accomplish during planting, which requires precise seed depth placement and spacing accuracy in order to maintain a good seed environment. Furthermore, a single field can have yield performance inconsistencies between different areas of the field. That is because a field can have a wide variety of soil types and management types or zones, such as irrigated and non-irrigated zones in different areas. Seed companies are developing multiple varieties of each of their seed product types to optimize yield in these different areas. The different seed varieties offer improved performance characteristics for different types of soil and management practices. Efforts have been made to plant multiple varieties of a particular seed product type in different areas of fields with different soil types or management zones. These efforts include planters that have different bulk fill hoppers and require the reservoir for each seed meter to be completely cleaned out or planted out before a different seed variety can be delivered to the seed meters. Some planters allow for planting two varieties and include ancillary row units or two separate and distinct seed meters at every row unit. Other planters allow for planting multiple varieties by feeding seeds of different types to seed meters at different times.

SUMMARY OF THE INVENTION

The present invention is directed to systems for row crop planting that allow for seeding or planting multiple types of seed while providing rapid switchover by maintaining multiple seed pools inside each seed meter sump while controlling which of the seed pools is exposed to a seed disk inside the seed meter.

According to one aspect of the invention, multiple type or multiple variety planting is accomplished with a single meter on each row of a planter with a seed switching mechanism to select which variety is planted by selecting which seed type is exposed to a seed disk at any given time. The sump of the seed meter is divided into two chambers, such as chambers A and B, each of which can contain a different type or variety (or hybrid) of seed in its own seed pool to be planted. A wall separates the seed pools from the seed disk. There is a door(s), such as a rotating door, which selects which seed, type A or B, can come in contact with the seed disk and be planted. The space between the door(s) and the seed disk is substantially smaller that the space of seed pools of known meter designs. This reduces the time it takes to fully change from one variety to another. The seed switching mechanism can be actuated using either rotational or linear motion. This can be done with a variety of suitable actuators to create rotary motion, such as by way of electric motors, electric/pneumatic solenoids, rotary actuators or to create linear motion, such as by way of linear actuators, electric/pneumatic solenoids, or the like.

According to another aspect of the invention, a seed meter is provided for planting multiple types of seed in a single planting pass during row crop planting of an agricultural field. The seed meter includes a housing arranged at a row unit of a planter and defining an enclosure that surrounds a housing cavity. A seed disk is arranged within the housing cavity and is configured to singulate seeds for individual delivery onto the agricultural field while planting. A split sump arrangement may be within the housing cavity. The split sump arrangement may provide a split sump for holding seed in multiple cavities or chambers that are configured to receive and separately hold seed of multiple types inside the housing cavity. A seed switching mechanism may be arranged between the split sump arrangement and the seed disk for selectively exposing ones of the multiple chambers to the seed disk. The seed switching mechanism may include a door assembly that can move to multiple positions to selectively expose the multiple chambers to the seed disk.

According to another aspect of the invention, the seeds of the multiple types in the multiple chambers may respectively define multiple seed pools that are maintained inside the housing cavity while planting.

According to another aspect of the invention, the door assembly may include multiple doors that are movable to selectively expose the ones of the multiple chambers to the seed disk. The multiple doors and multiple chambers can correspond to each other in number so that each of the multiple chambers has a corresponding door. The multiple doors may include at least a first door and a second door in face-to-face sliding engagement with each other.

According to another aspect of the invention, an actuator system may be provided for moving the first and second doors. The actuator system may move the first and second doors in an overlapping position with respect to each other. Moving the doors to a first overlapping position exposes a first chamber to the seed disk to allow the seed disk to pick up seeds from the first chamber. Moving the doors to a second overlapping position exposes a second chamber to the seed disk to allow the seed disk to pick up seeds from the second chamber. The actuator system may move the first and second doors in unison with each other while moving the first and second doors to the first and second positions for respectively exposing the first and second ones of the multiple chambers to the seed disk. The actuator system may move the first and second doors apart from each other to block exposure of both of the first and second chambers to the seed disk to prevent additional seed from being supplied to the disk in order to reduce the size of the seed pool adjacent the seed disk. This may be done by moving the doors to prevent additional seed from being supplied from sump chambers of a split sump to a disk exposure chamber from which the seed disk picks up seed.

According to another aspect of the invention, each of the multiple doors may include an inner end toward a central segment of the meter housing and an outer end toward an outer segment of the meter housing. The multiple doors may move between the open and closed positions by pivoting about the respective inner end(s), which may include pivoting about a fastener such as a pin or screw. Each of the multiple doors may include a door tab at the outer end for engaging an actuator to move the respective door. Each of the door tabs may extend through the housing so that at least a portion of each of the door tabs is spaced from the housing cavity. Each door includes a door body. The door tab of a first door extents along a straight line from the outer end of the door body of the first door. A second door includes a bracket that connects its tab to its door body so that the door tab and door body of the second door are transversely offset with respect to each other.

According to another aspect of the invention, the split sump arrangement may include a sump insert. The sump insert may include a faceplate arranged parallel to the seed disk. First and second faceplate openings may extend through the faceplate. A divider wall may extend perpendicularly from the faceplate between the first and second faceplate openings. The divider wall may provide a barrier between the first and second cavities or chambers of the split sump arrangement and the door assembly may be arranged between the first and second faceplate openings and the seed disk.

According to another aspect of the invention, a planter is provided for planting seed of multiple seed types in a single planting pass during row-crop planting of an agricultural field. The planter includes a frame that supports multiple row units. A seed storage system separately stores seeds of at least a first type and a second type on the planter. A seed meter is arranged at each of the multiple row units. The seed meter receives seeds of the first and second types and delivers seeds of a selective one of the first and second types for planting the field. The seed meter has a meter housing that defines an enclosure surrounding a seed disk configured to singulate seeds for individual delivery onto the field while planting. A first chamber is arranged in the meter housing to receive the first type of seeds and to provide a first seed pool in the first chamber that is selectively exposed to the seed disk. A second chamber is arranged in the meter housing to receive the second type of seeds and to provide a second seed pool in the second chamber that is selectively exposed to the seed disk. A first door is arranged between the first chamber and the seed disk. The first door is movable between an open position that exposes the first seed pool to the seed disk and a closed position that provides a barrier between the first seed pool and the seed disk. A second door is arranged between the second chamber and the seed disk. The second door is movable between an open position that exposes the second seed pool to the seed disk and a closed position that provides a barrier between the second seed pool and the seed disk.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
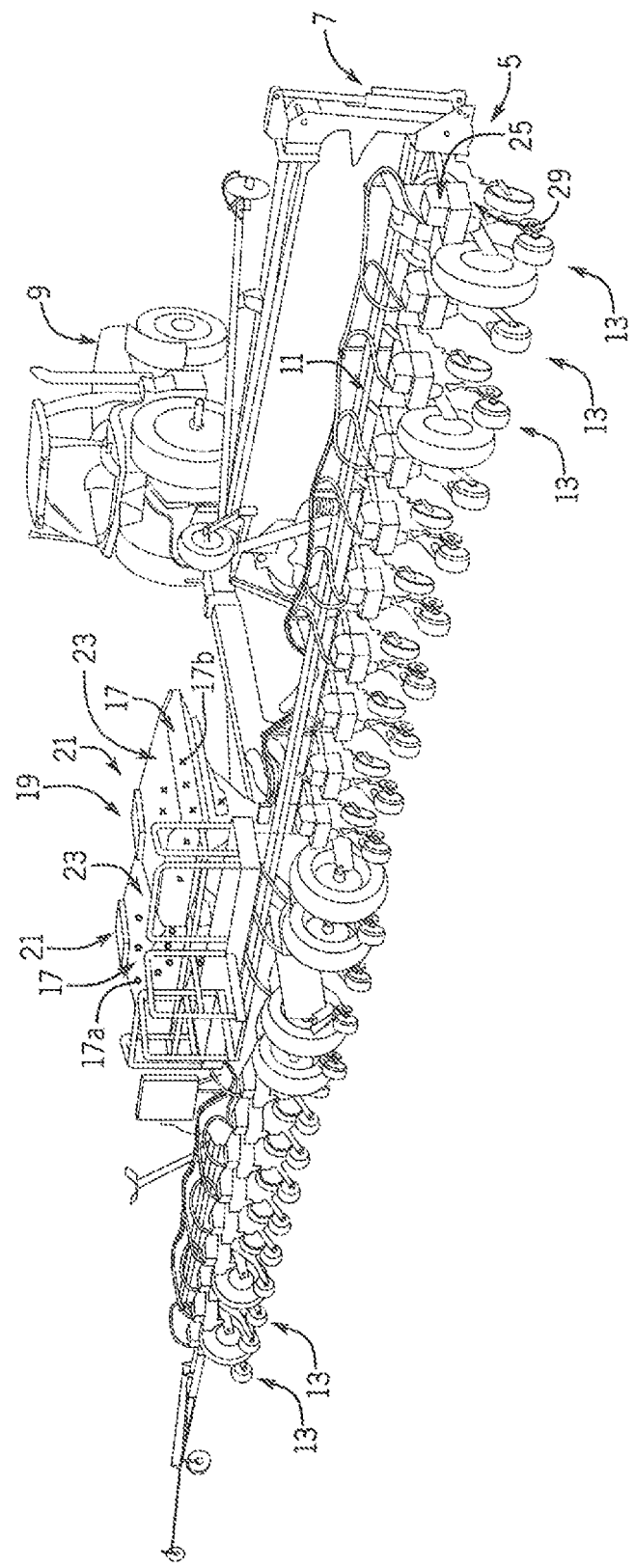
FIG. 1 is a simplified schematic representation of a planter with seed meters for planting multiple varieties of seed.

Referring now to the drawings and specifically to FIG. 1, a planting system 5 for planting multiple types or varieties of seed and automatically and rapidly switching between the types or varieties during planting in a single planting pass while maintaining multiple seed pools inside seed meters with multiple seed types and controlling exposure of the seed pools to seed disks of the seed meters, as explained in greater detail elsewhere herein.

System 5 includes an agricultural implement, shown here as planter 7, which may be one of the EARLY RISER® series planters available from Case IH and is typically pulled by a traction device such as a tractor 9. A frame 11 of the planter 7 supports multiple row units 13 that are substantially identical. Each row unit 13 includes various support, metering, and ground-engaging components. These may include a sub-frame that is connected to the frame 11 of the planter 7 by way of a parallel linkage system and furrow opening and closing mechanisms toward front and back ends of the row unit 13. The opening and closing mechanisms may include opener disks and closing disks, respectively, or other ground-engaging tools for opening and closing a furrow. Each row unit 13 may include a gauge wheel configured for adjusting furrow depth by limiting soil penetration of the furrow-opening mechanism while creating the furrow, and a press wheel may be arranged to roll over the closed furrow and to further firm the soil over the seed to promote favorable seed-to-soil contact.

Still referring to FIG. 1, seed 17 is held in a seed storage system shown here as bulk storage in a bulk storage system 19. Bulk storage system 19 has at least one bulk fill hopper 21, shown here as having two central bulk fill hoppers 21 supported by the frame 11 of the planter 7, remote from the row units 13. The bulk storage system 19 has two compartments 23 with one shown in each of the bulk fill hoppers 21. It is understood that the bulk or other storage system may have more than two compartments 23, which may correspond to the number of types of seeds being used for multiple type or variety planting. Additional compartments 23 may be provided in each of the bulk fill hoppers 21 by divider walls or partitions. It is understood that at least some bulk storage may be at the row units 13 themselves, such as by way of manual-fill on-row storage compartments. The different compartments 23 may hold seeds 17 of a different plant type or a common plant type but different varieties or types 17a, 17b, for planting in different multiple type or variety zones of an agricultural field defined at least in part by characteristics relating to at least one of soil type and management type, or other characteristics such as low/high ground areas, weed issues, insect issues, fungal issues, buffer zones in organic fields that are planted next to non-organic fields, or others, such as those represented as zones VZ1 and VZ2 in the prescription map PM of FIG. 13. Although two different seed varieties or types 17a, 17b are shown, it is understood that other numbers of seed varieties may be stored on and planted by the planter 7 based on, for example, the number of compartments 23 in the bulk storage system 19 for a particular planter 7. Although the seed 17 may be described elsewhere herein as different types 17a, 17b, it is understood that the description of the different types of seed includes different hybrids or varieties. In other words, the different types 17a, 17b of seed 17 include not only different hybrids or varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide tolerant seed, or other different products. The different seed products can further include different crop seeds such as corn and soybeans, oats and barley, different cover crops such as tillage radishes and rye, or various combinations of these or other combinations.

Figure 2:
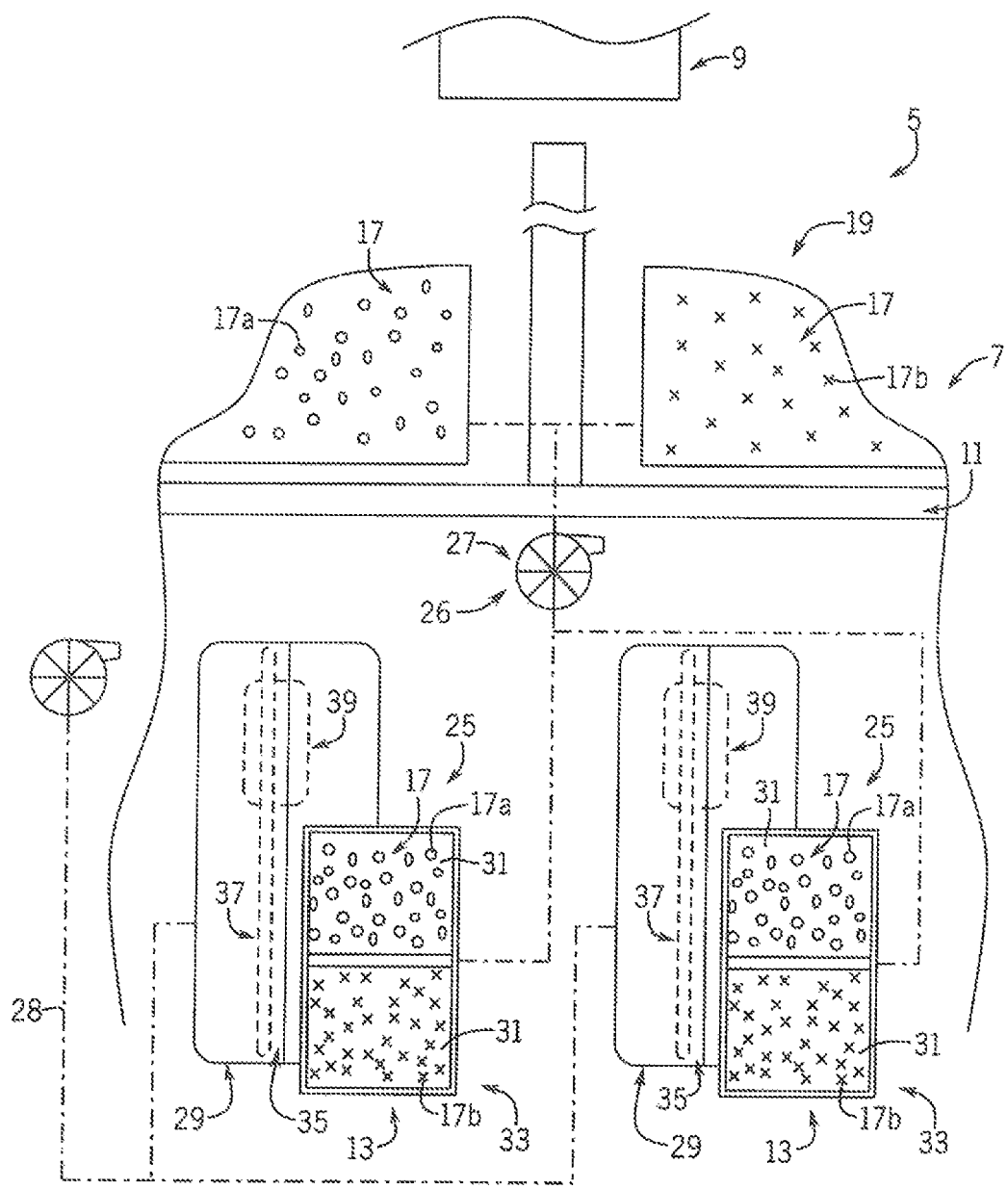
FIG. 2 is a simplified schematic representation of a portion of the planter of FIG. 1.

Referring now to FIG. 2, planter 7 includes airflow system 26 that provides pneumatic power for use by various components of the planter 7 by way of, for example, positive air pressure source(s) and vacuum source(s) for establishing positive and/or vacuum pressures and corresponding airflows, depending on the particular configuration of the pneumatic system(s) in which they are incorporated. The positive air pressure source(s) and vacuum source(s) can be known pumps, fans, blowers, and/or other known airflow system components. Airflow system 26 includes a seed conveyance airflow system 27 and a seed meter airflow system 28. Seed conveyance airflow system 27 pneumatically delivers seeds of the different types 17a, 17b from the bulk storage system 19 into an on-row storage system 25. Seed conveyance airflow system 27 delivers the seed 17 in an airflow that entrains the seed 17 and flows along a flow path defined by, for example, conduits that extend along the planter 7 to the row units 13 to be dropped into the seed trench formed by the furrow opening mechanism. Seed meter airflow system 28 provides negative and/or positive pressure for operation of seed meters at the row units 13, explained in greater detail elsewhere herein. On-row storage system 25 locally stores relatively small amounts of seeds 17 at each of multiple row units 13 to feed a seed-metering system 29 which can be configured to simultaneously plant different types 17a, 17b from the different row units 13, or otherwise switch seed types 17a, 17b being planted from a single row unit 13, as explained in greater detail elsewhere herein. The different seed types 17a, 17b sent from the bulk storage system 19 are stored in multiple compartments 31 of the on-row storage system 25 at each row unit 13. The compartments 31 of the on-row storage system 25 may be defined within a vented mini-hopper 33 receiving seeds from the bulk storage system 19, optionally, at least one on-row bulk tank, or other separate and distinct compartments on the row unit 13.

Still referring to FIG. 2, the compartments 31 of the on-row storage system 25 feed the seed types 17a, 17b to seed meter 35 of the seed-metering system 29. Each seed meter 35 can be a purely mechanical-type seed meter 35 or a pneumatic seed meter 35. Seed meter 35 maintains multiple seed pools of multiple seed types inside of seed meter 35, selectively exposing one(s) of the seed pools to an internal seed disk 37. Seed disk 37 is rotated to move at least a surface of the seed disk through the one(s) of the seed pools inside of the seed meter 35 that is exposed to the seed disk 37 at a given time, as explained in greater detail elsewhere herein, to pick up and singulate seeds using seed pockets or fingers from the respective seed pool and convey the individual seeds through the seed meter 35 for individual release out of the seed meter 35 through seed delivery system 39, which may include a seed tube, a seed delivery belt, or other seed delivery mechanism, toward a seed trench of the agricultural field. Rotation of seed disk 37 is accomplished by way of a seed disk drive system. The seed disk drive system may include, for example, various electric or hydraulic motors, drive shafts, chains and belts, clutches, peg and hole drive systems, and/or other arrangements such as a directly driven arrangement in which a motor directly drives the seed disk at its hub or periphery. Pneumatic seed meters 35 of negative pressure types are further operably connected through a vacuum inlet 57 (FIG. 3) to the seed meter airflow system 28 of airflow system 26 to provide a vacuum airflow within a vacuum chamber establishing a negative or vacuum pressure within the seed meter 35 opposite the seed pool(s) allowing the seeds 17 to be held against the seed disk 37 such as within the seed pockets by the vacuum pressure. Pneumatic seed meters 35 of positive pressure types are operably connected through a pressurized air inlet (not shown) to the seed meter airflow system to provide a positive airflow and a corresponding positive pressure at the seed side of the seed disk within the seed meter 35, whereby seeds from the seed pool are pushed and held against the seed disk, such as within the seed pockets, by positive pressure.

Figure 3:
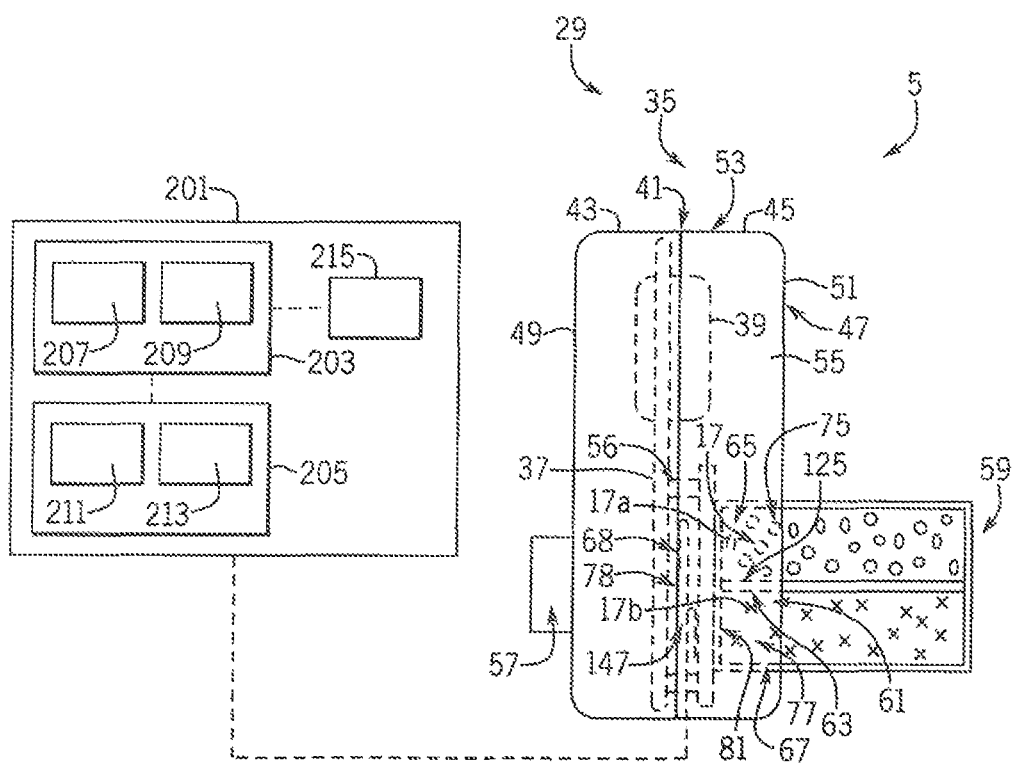
FIG. 3 is a simplified schematic representation of a seed meter of the planter of FIG. 1.

Referring now to FIG. 3, seed meter 35 includes a housing 41 with first and second side portions shown as left and right or first and second covers 43, 45. Each of covers 43, 45 has a side wall that defines a closed end, a circumferential sidewall that extends from the sidewall at the closed end and an open end at the side opposite the closed end. The covers 43, 45 connect to each other at their peripheries defined by the respective circumferential side walls with the open ends facing toward each other to define enclosure 47 with first and second housing side walls 49, 51 and a housing circumferential sidewall 53 to collectively surround housing cavity 55 in which seed disk 37 is at least partially arranged for rotation. Although seed disk 37 is shown in FIG. 3 as entirely enclosed within housing 41 and its housing cavity 55, it is understood that at least a portion of seed disk 37 may extend out of the housing 41 and its housing cavity 55. Other components may be arranged within the housing cavity 55, such as various seals that engage seed disk 37 to provide vacuum shut off or positive pressure isolation and a seed singulator that is configured to inhibit more than one seed from being discharged from the seed meter 35 per seed discharge event. Brush assembly 56 is arranged within the housing cavity 55 and includes upper brush strip 56a (FIG. 4) and lower brush strip 56b (FIG. 4) that together form a barrier that retains the seed 17 inside the housing cavity 55 instead of, for example, spilling out of the meter through the seed delivery system 39. Lower brush strip 56b is shown with an upper segment that extends generally vertically from a lower end of upper brush strip 56a and a lower segment that extends from a lower end of the lower brush strip 56b upper segment, angularly down and to the right, as illustrated. Vacuum inlet 57 is provided at the first housing side wall 49 for connecting seed meter 35 to a vacuum hose that applies vacuum pressure from a vacuum pump or other vacuum source of seed meter airflow system 28 (FIG. 2) to pull seeds 17 into the seed pockets of seed disk 37. Seed inlet 59 is provided at the second housing side wall 51 and defines a passage that receives seeds 17 from on-row storage system 25 and freely delivers the seeds 17 into housing cavity 55.

Still referring to FIG. 3, split sump arrangement 61 is defined within housing cavity 55 and provides a split sump 63 for holding seeds 17 of multiple types 17a, 17b that were delivered from on-row storage system 25 through seed inlet 59. Split sump 63 has multiple chambers that are defined inside housing cavity 55. Split sump 63 is shown here with two sump chambers 65, 67 that define two sump seed pools 75, 77 that separately hold seeds of the different types 17a, 17b, although it is understood that more than two sump chambers 65, 67 may be defined in the split sump arrangement 61 to provide more than two sump seed pools 75, 77. Split sump 63 is shown here as having a disk exposure chamber 68 that is arranged between sump chambers 65, 67 and seed disk 37. Disk exposure chamber 68 is configured to selectively receive seeds 17 from the seed pools 75, 77 of the sump chambers 65, 67 and defines a disk exposure seed pool 78 through which the seed disk 37 rotates and from which the seed disk 37 picks up seed 17. Split sump arrangement 61 can include a sump insert, shown here as sump insert 81. Sump insert 81 is shown as a single component that fits as a unit into housing cavity 55 to divide the housing cavity 55 into discrete segments, although it is understood that the sump insert 81 may be provided as a framework of multiple components to divide the housing cavity 55 into discrete segments.

Figure 4:
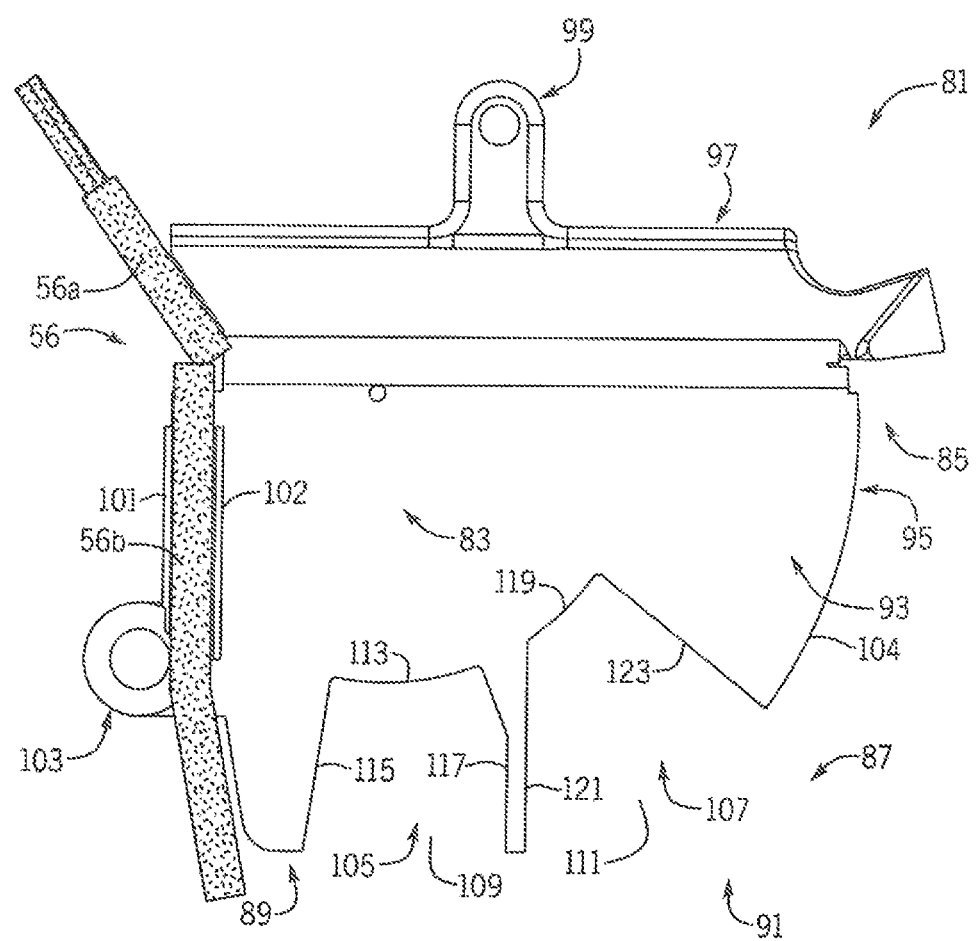
FIG. 4 is a front elevation of an simplified schematic representation of a sump insert of the seed meter of FIG. 3
Figure 5:
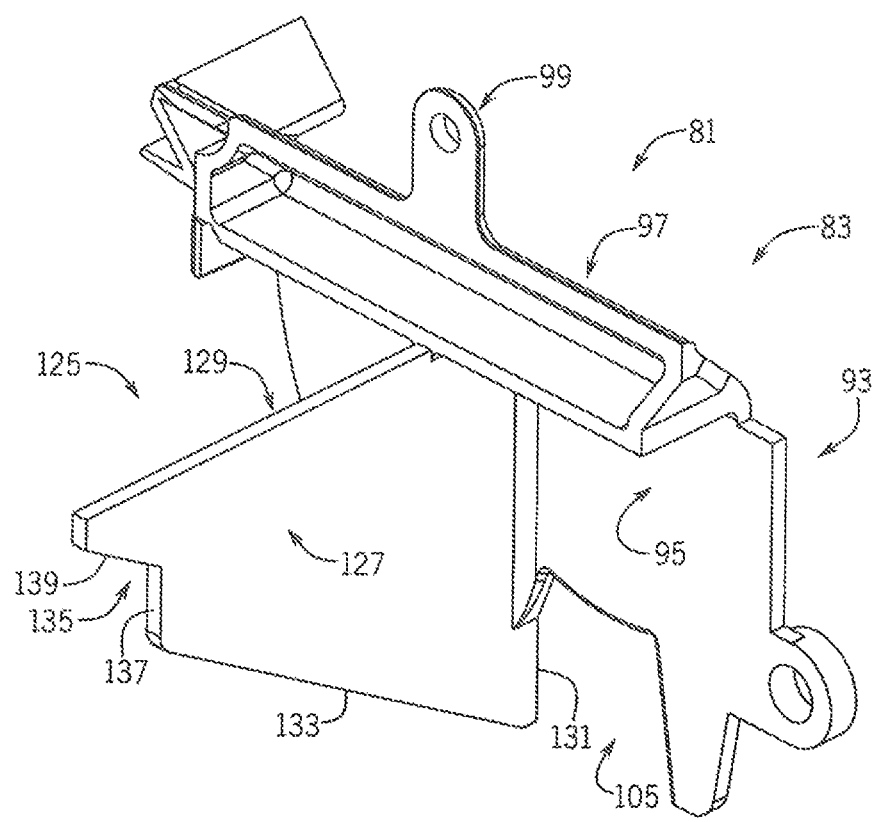
FIG. 5 is an isometric view from above and to the right of the sump insert of FIG. 4.
Figure 6:
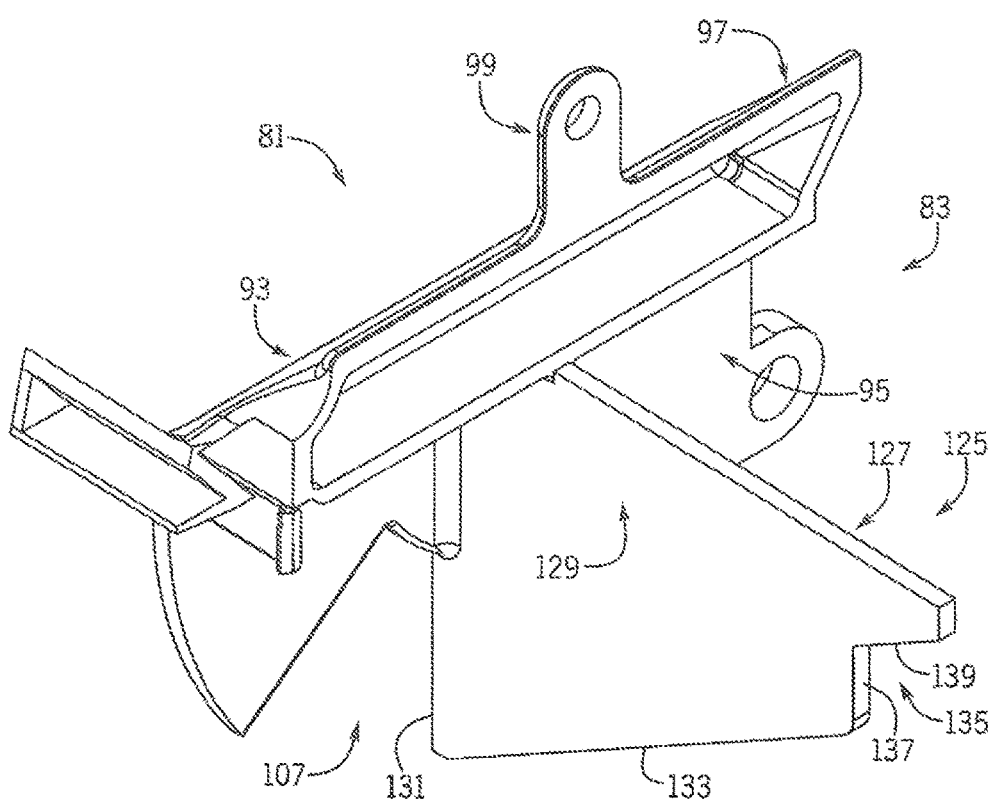
FIG. 6 is an isometric view from above and to the left of the sump insert of FIG. 4.

Referring now to FIG. 4, sump insert 81 includes faceplate 83 that is arranged parallel to seed disk 37 (FIG. 3) and housing side walls 49, 51 (FIG. 3) and may have mounting structure(s) for mounting sump insert 81 within the housing cavity 55. Faceplate 83 has upper and lower segments 85, 87, a pair of side segments shown as left and right side segments 89, 91, front surface 93 that faces toward seed disk 37, and back surface 95 that faces toward seed inlet 59 (FIG. 3). Faceplate upper segment 85 includes shelf 97 that extends rearwardly toward seed inlet 59 and has a forward extending cavity (FIGS. 5-6). As shown in FIG. 4, shelf 97 may provide at least part of the mounting structure of sump insert 51. As one example, tab 99 extends upwardly from an upper edge of the shelf 97 and has a hole that can accommodate a screw for securing the sump insert 81 to cover 45; optionally, the hole may be sized to accommodate fitting over a mounting boss, such as a mounting boss for a seed baffle. Left side segment 89 includes a vertically extending outer edge 101 from which tab 103 extends outwardly with a hole for accommodating fitting over a mounting boss such as a mounting boss that extends from cover 45 to receive a fastener that secures sump insert 81 within housing cavity 55. Brush holder 102 is arranged at the front surface 93 of insert faceplate 83, toward the outer edge 101 at the left side segment 89. Brush holder 102 is shown as an elongate bracket with a slot that receives and holds lower brush strip 56b at its upper segment and removably holds the lower brush strip 56b by friction fit or other mechanical mounting to allow replacement of the lower brush strip 56b from the sump insert 81. Upper brush strip 56a may be mounted to an inside surface of cover 45 and may include a cutout that faces seed disk 37 and allows seeds 17 carried by seed disk 37 to pass through the cutout to arrive at a drop or vacuum cutoff location above seed delivery system 39 to release the seed 17 from the seed disk 37 into the seed delivery system 39. A curved edge 104 extends from a lower end of the left side segment outer edge 101 to define an outer periphery of lower segment 87 and right side segment 91. First and second doorways 105, 107 define outer peripheries of voids or openings, shown as plate openings 109, 111 that extend through faceplate 83. Both doorways 105, 107 are shown at the faceplate lower segment 87, with doorway 105 arranged toward left side segment 89 and doorway 107 arranged toward right side segment 91. Doorway 105 has a curved upper edge 113 and left and right side edges 115, 117. Left side edge 115 extends downwardly from a left end of upper edge 113. Right side edge 117 includes upper and lower segments that angularly intersect each other, with the upper segment of right side edge 117 extending downwardly from a right end of upper edge 113. The lower segment of right side edge 117 extends generally vertically down from the upper segment of right side edge 117. Doorway 107 has a curved upper edge 119 and left and right side edges 121, 123. Curved upper edge 119 extends along a projection of upper edge 113 of doorway 105, with the doorway upper edges 113, 119 circumscribing a path that is generally parallel to the curvature of faceplate 83. Left side edge 121 extends downwardly from a left end of upper edge 119. Right side edge 123 extends downwardly from a right end of upper edge 119. The lower edges of the insert faceplate 83 can nest against an inwardly facing surface of seed meter housing 41 so that the housing 41 and doorways 105, 107 collectively define ports through which plate openings 109, 111 extend for allowing seeds 17 to pass through faceplate 83.

Referring now to FIGS. 5 and 6, divider wall 125 is shown extending perpendicularly from faceplate back surface 95, between the first and second doorways 105 (FIG. 5), 107 (FIG. 6). Divider wall 125 has a generally triangular perimeter shape and has opposing left and right side surfaces 127, 129 that face toward chambers 65, 67 and their respective seed pools 75, 77 (FIG. 3). A front end of divider wall 125 includes forward edge 131 that is defined at the intersection of divider wall 125 and faceplate 83 and defines respective portions of the right side edge 117 and left side edge 121 of doorways 105 and 107. Lower edge 133 extends angularly from a lower end of forward edge 131, rearwardly and upwardly toward a hack end of divider wall 125. Cutout 135 includes intersecting edges, shown as a vertical edge as a first cutout segment 137 that nests against a forward-facing surface of a rear wall of seed inlet 59 (FIG. 3). An angular edge of cutout 135 is shown as second cutout segment 139 that intersects the first cutout segment 137 to engage an upper edge of the rear wall of seed inlet 59 (FIG. 3).

Figure 7:
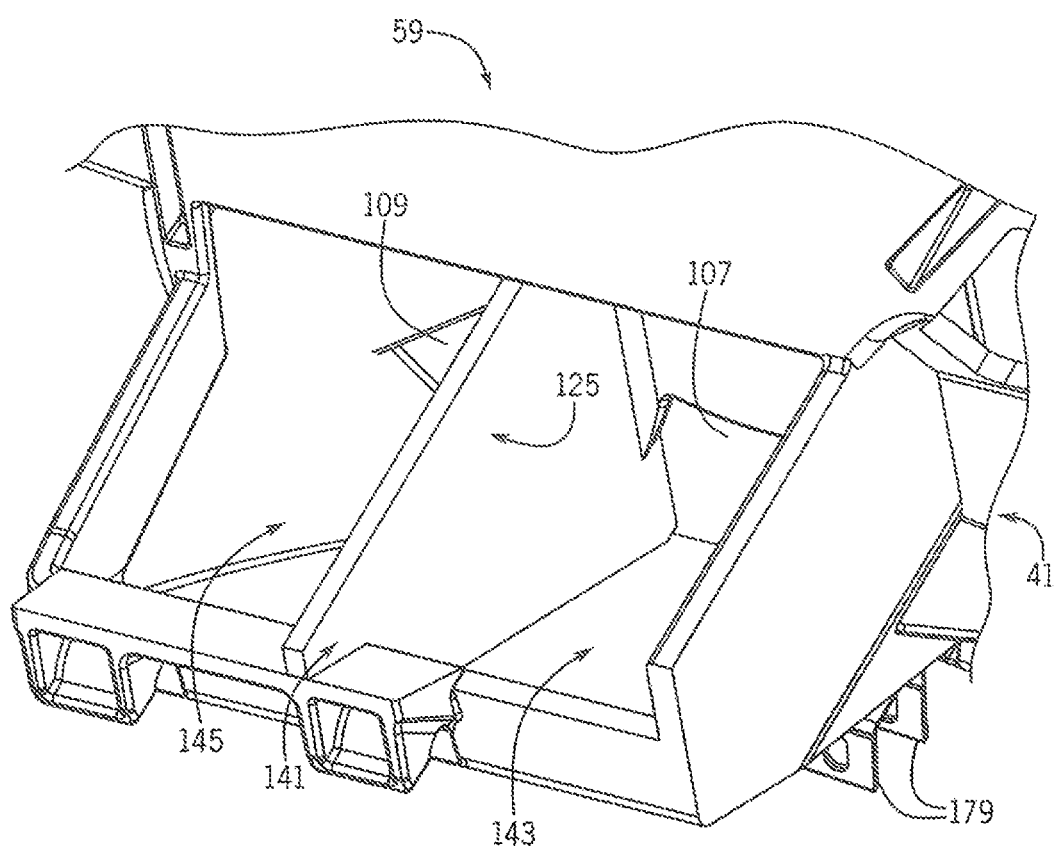
FIG. 7 is an isometric view of a split inlet passage of the seed meter of FIG. 3.

Referring now to FIG. 7, as shown, divider wall 125 not only provides a barrier between chambers 65, 67 (FIG. 3) and their respective seed pools 75, 77 (FIG. 3), but also extends continuously through the seed inlet 59. In this way, divider wall 125 defines a split inlet passage 141 of seed inlet 59 with first and second inlet passage segments 143, 145. First and second inlet passage segments 143, 145, respectively, receive the seed types 17a, 17b from compartments 31 of mini-hopper(s) 33 (FIG. 2) and direct the seed types 17a, 17b into sump chambers 65, 67 (FIG. 3) and their respective seed pools 75, 77 (FIG. 3).

Figure 8:
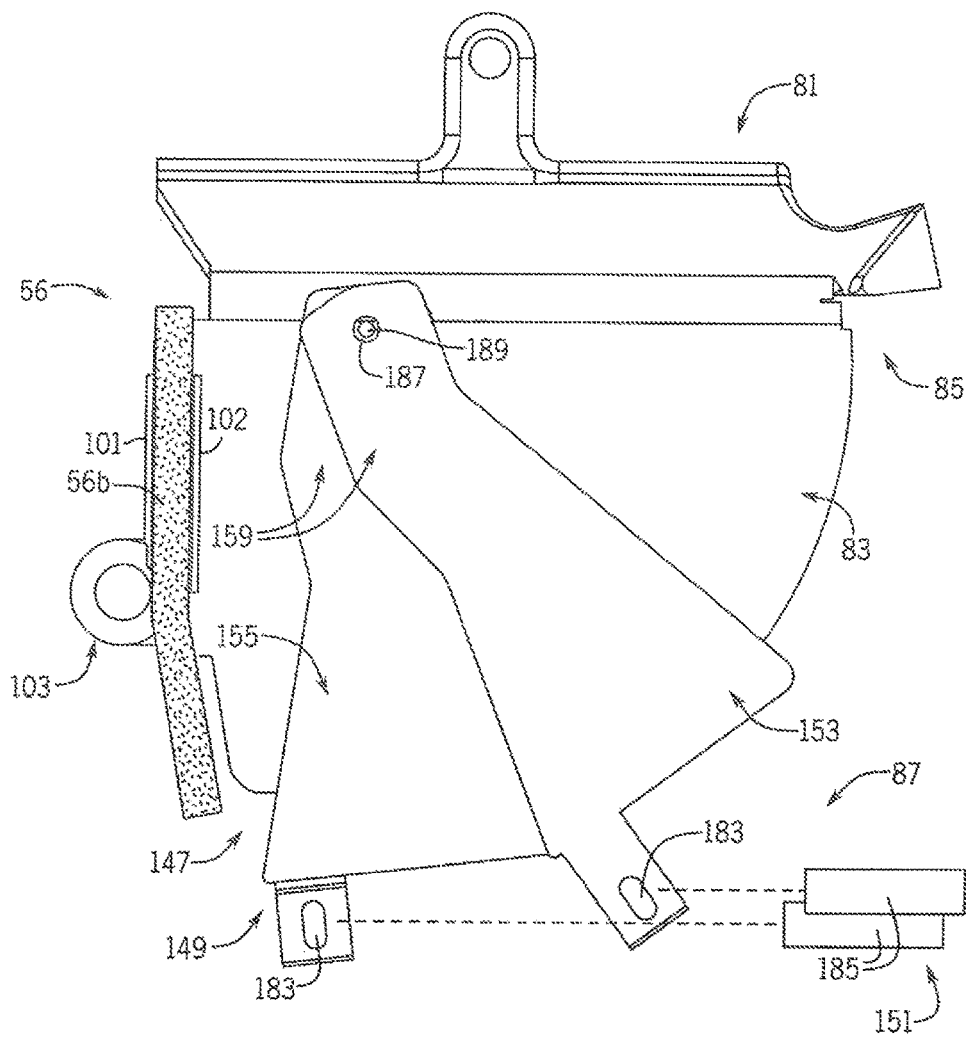
FIG. 8 is a front elevation of a door assembly on the sump insert of FIG. 4.
Figure 9:
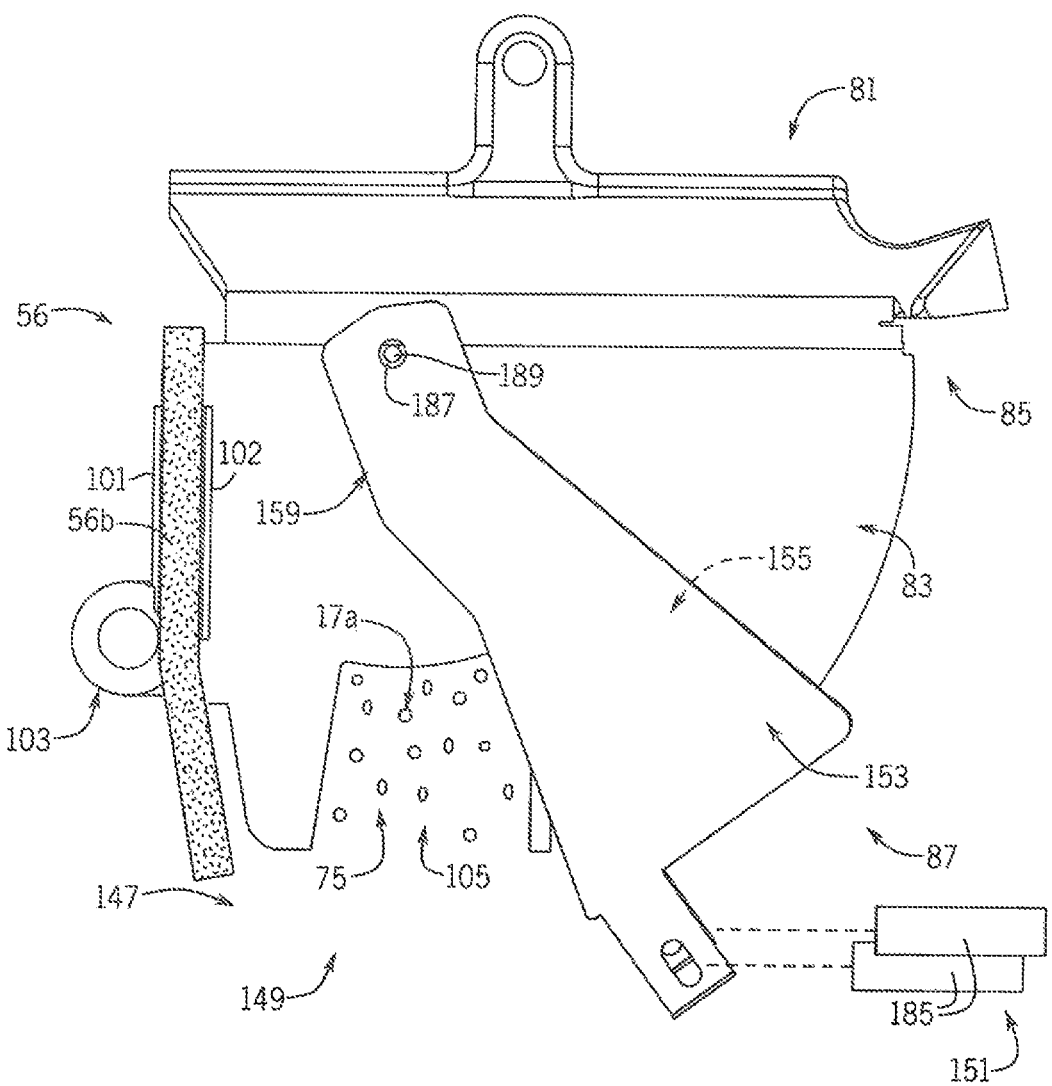
FIG. 9 is a front elevation of the door assembly of FIG. 8 in another position.
Figure 10:
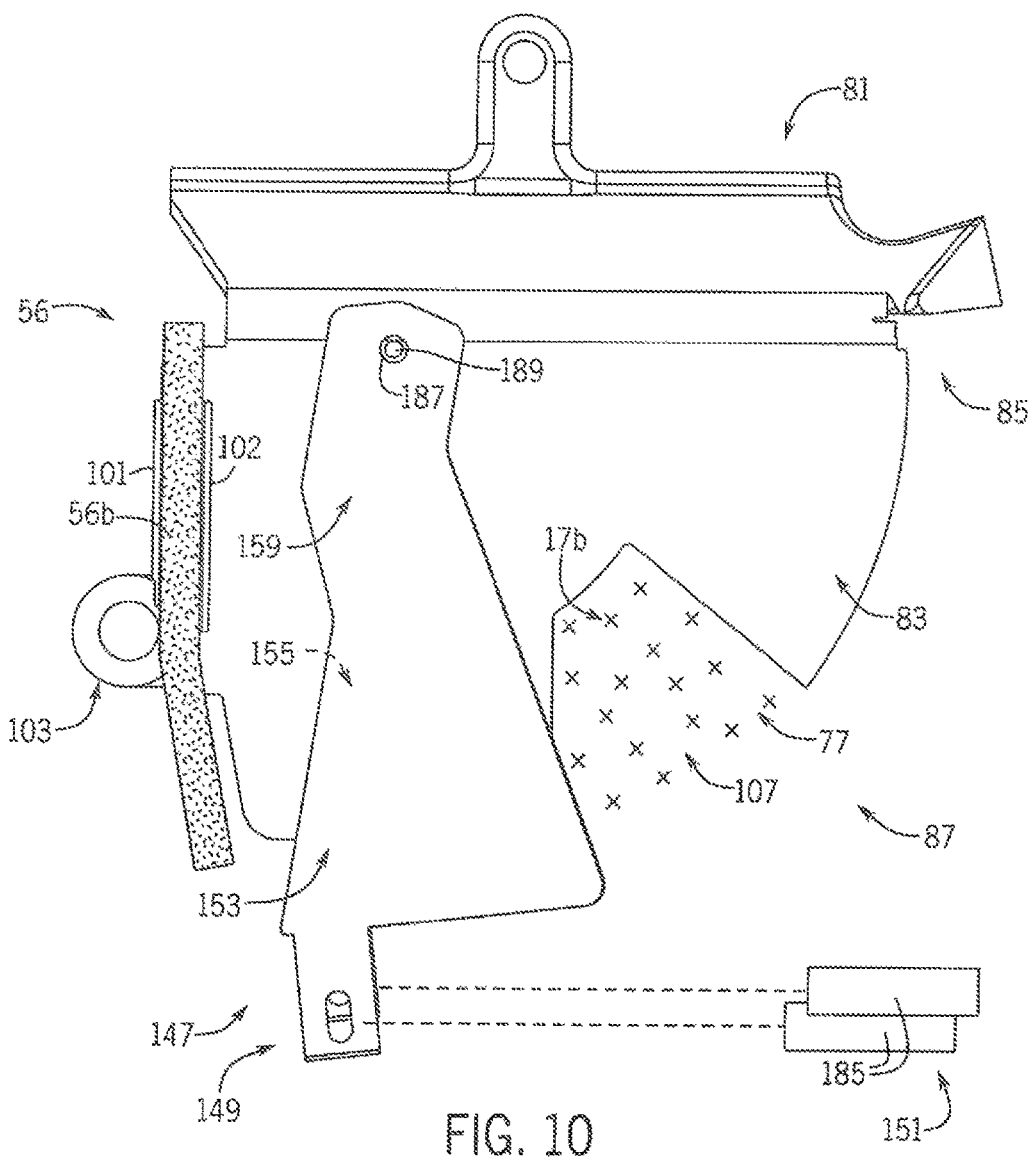
FIG. 10 is a front elevation of the door assembly of FIG. 8 in another position.

Referring now to FIGS. 3 and 8, seed switching mechanism 147 is arranged between the split sump arrangement 61 and the seed disk 37 for selectively exposing the multiple sump chambers 65, 67 and their sump seed pools 75, 77 to seed disk 37. This may be done by arranging seed switching mechanism 147 between sump chambers 65, 67 and disk exposure chamber 68 so that the seed switching mechanism 147 selectively releases the different seed types 17a, 17b at different times to change which of the seed types 17a, 17b are supplied from sump seed pools 75, 77 to exposure seed pool 78 to be picked up by seed disk 37. Referring now to FIG. 8, seed switching mechanism 147 is shown having door assembly 149 and actuator system 151 that drives movement of door assembly 149 to selectively expose chambers 65, 67 and their seed pools 75, 77 to seed disk 37 (FIG. 3), which may be done by passing through exposure chamber 68 and its exposure seed pool 78. FIG. 9 shows door assembly 149 in a first position that opens doorway 105 to expose sump seed pool 75 to exposure seed pool 78 (FIG. 3) and seed disk 37 (FIG. 3). FIG. 10 shows door assembly 149 in a second position that opens doorway 107 to expose sump seed pool 77 to exposure seed pool 78 (FIG. 3) and seed disk 37 (FIG. 3).

Referring again to FIG. 8, door assembly 149 has multiple doors, shown as first and second doors 153, 155. In FIGS. 8-10, doors 153, 155 are shown in sliding face-to-face engagement with each other, for example, with the first door 153 overlying the second door 155 so that the doors 153, 155 can fan out with respect to each other, or the first door 153 can substantially overlap the second door 155.

Figure 11:
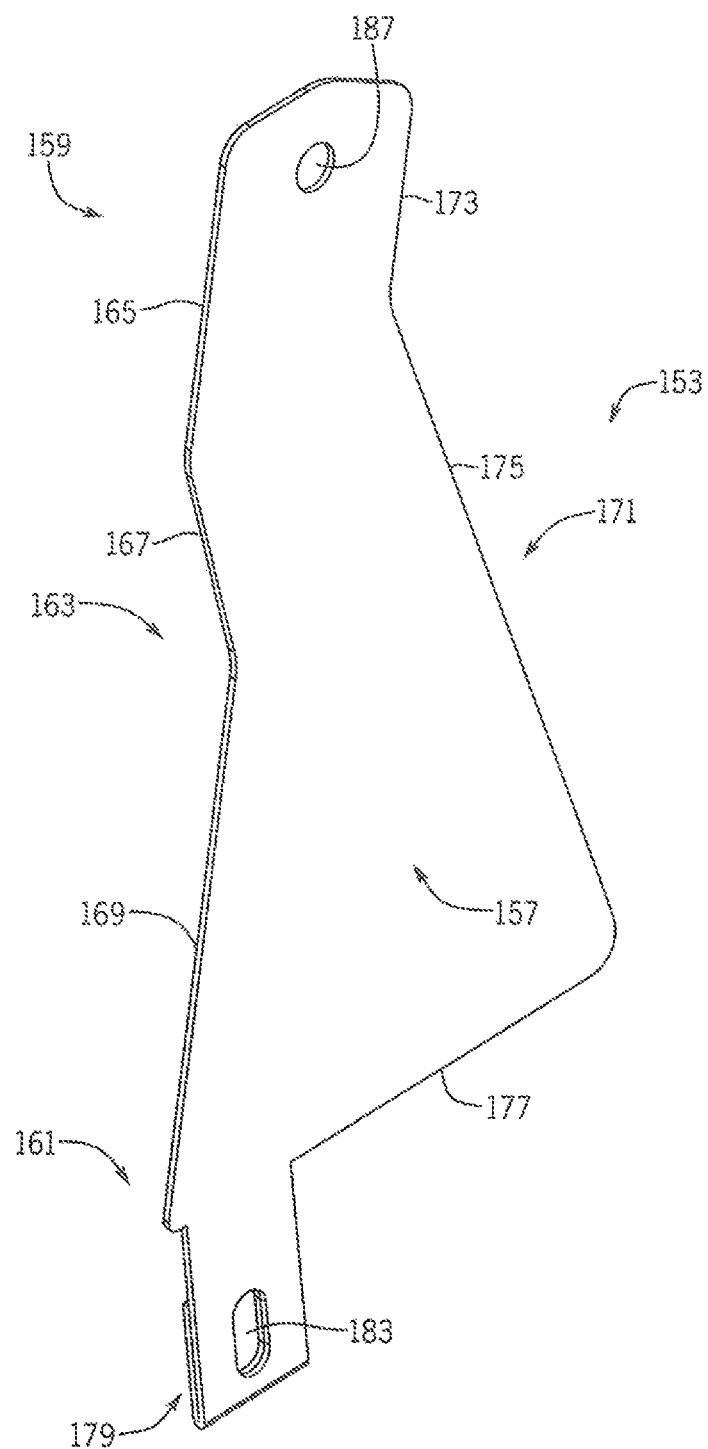
FIG. 11 is an isometric view of a door of the door assembly of FIG. 8.
Figure 12:
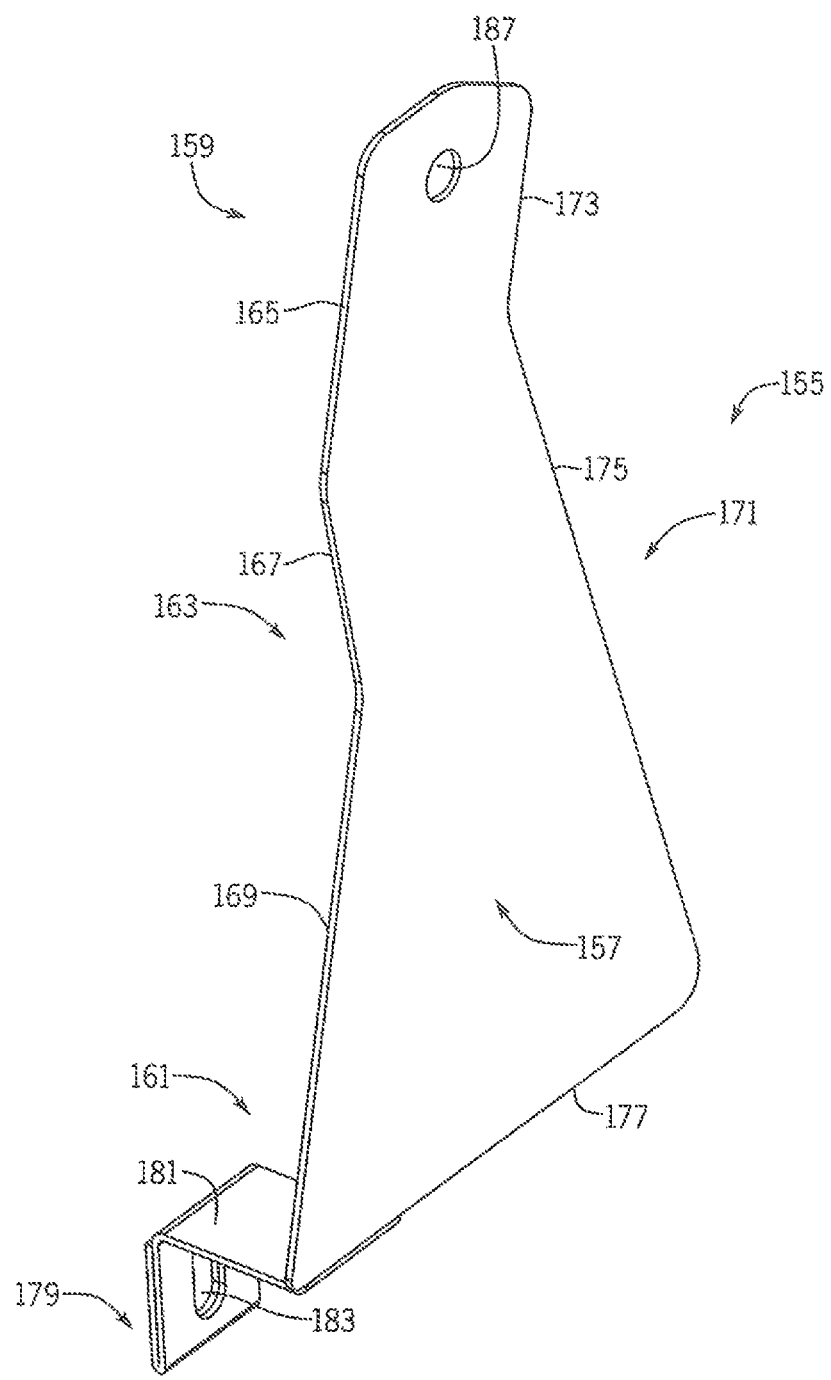
FIG. 12 is an isometric view of another door of the door assembly of FIG. 8.

Referring now to FIGS. 11-12, doors 153, 155 are shown with substantially identical perimeter shapes, although it is understood that the doors 153, 155 may have different shapes. Each of the doors 153, 155 has a door body 157 with an inner end 159 positioned toward a central segment of meter housing 41 (FIG. 4) toward faceplate upper segment 85 and an outer end 161 positioned toward an outer segment of the meter housing 41 (FIG. 4) toward faceplate lower segment 87. Left edge 163 extends along the left side of door body 157 and includes a first left segment 165 that is shown extending generally vertically down. A second left segment 167 extends from a lower end of first segment 165 angularly inward into door body 157. A third left segment 169 extends from a lower end of second left segment 167 angularly outward from door body 157. Right edge 171 extends along the right side of door body 157 and includes a first right segment 173 that is shown extending generally vertically down. A second right segment 175 extends down and outwardly from a lower end of first right segment 173. A third right segment 177 extends from a lower end of second right segment 175 transversely across the bottom of door body 157 to define a bottom end of the door body 157. Each of doors 153, 155 has a door tab 179 at its outer end 161 for engaging the actuator system 151 (FIG. 8) to allow the actuator system 151 to move the respective door 153, 155. Referring now to FIG. 11, door tab 179 of first door 153 is shown extending along a straight line from the door body outer end 161. Referring now to FIG. 12, second door 155 is shown with a bracket 181 that connects its door tab 179 to the door body outer end 161 so that the door tab 179 and door body 157 of the second door 155 are transversely offset with respect to each other. Referring now to FIG. 7, the door tabs 179 are shown outside of the meter housing cavity (FIG. 3), extending through the meter housing 41 so that the mechanical coupling of the door tabs 179 to actuator system 151 occurs outside of the seed meter 35.

Referring again to FIG. 8, each door tab 179 is shown with slot 183 that is configured to receive hardware for connecting the door tab 179 to actuator system 151 (FIG. 8). Actuator system 151 is shown here with a pair of actuators, such as linear actuators 185 that have rods which extend and retract relative to the main bodies of the linear actuators 185 to push or pull the door tabs 179 for moving the doors 153, 155. The actuators 185 may be, for example, electric/pneumatic solenoids or other actuators to create linear motion. It is further understood that movement of the doors 153, 155 may instead be done through rotary motion, such as by way of electric motors, electric/pneumatic solenoid based rotary devices, or the like. As shown in FIG. 8, actuator(s) 185 can move the first and second doors 153, 155 apart from each other to block exposure of both of the first and second chambers 65, 67 (FIG. 3) and corresponding seed pools 75, 77 to seed disk 37 to prevent seeds 17 from being further supplied to the seed disk 37 from either sump seed pool 75, 77 while the seed disk 37 continues to pick up the remaining seeds 17 in the exposure seed pool 78. Actuator system 151 may move the first and second doors 153, 155 either in unison with each other or in separate stages while moving to the first and second positions (FIGS. 9 and 10) for respectively exposing the chamber(s) 65, 67 (FIG. 3) and seed pool(s) 75, 77 to seed disk 37 (FIG. 3).

Retching now to FIGS. 8-10, movement from actuator system 151 is shown as imparting a pivoting movement to the doors 153, 155. Door body inner ends 159 have holes 187 that fit over a fastener 189 such as a pin, a screw, or the like, that pivot connects the doors 153, 155 to faceplate 83 of sump insert 81. Fastener 189 defines a pivot axis of both doors 153, 155 and which may also define an axis of rotation of seed disk 37 (FIG. 3).

Figure 13:
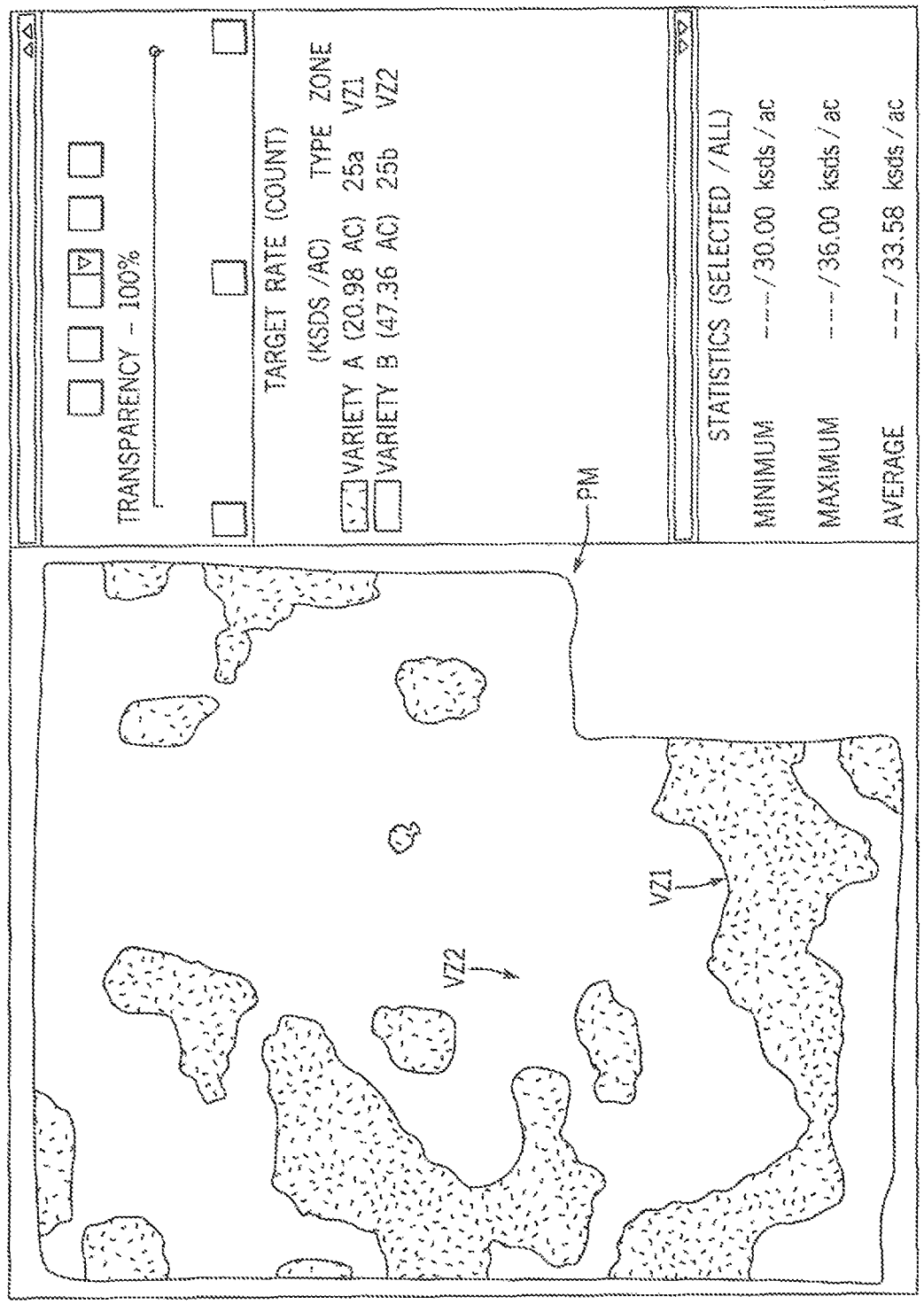
FIG. 13 is an example of a seed variety prescription map for use with the planting system.

Referring now to FIGS. 3 and 13, planting system 5 is controlled by control system 201 to plant multiple types or varieties of seed 17 and automatically and rapidly switch between the types or varieties during planting in a single planting pass by selectively exposing different seed types 17a, 17b within housing cavity 55 to seed disk 37.

Still referring to FIGS. 3 and 13, control system 201 includes tractor control system 203 and planter control system 205 that operably communicate with each other, for example, by way of an ISOBUS connection, for coordinating controls of tractor 9 (FIG. 1) and planter 7, including which seed type(s) 17a, 17b are delivered, based on the type or variety zones VZ1, VZ2 of the agricultural field. Variety zones VZ1, VZ2 may correspond to a seed type or variety prescription map PM as shown in FIG. 13. In FIG. 3, tractor control system 203 is shown having a tractor controller 207 and power supply 209, and planter control system 205 is shown having a planter controller 211 and power supply 213. Each of the tractor and planter controllers 207, 211 can include an industrial computer or, e.g., a programmable logic controller (PLC), along with corresponding software and suitable memory for storing such software and hardware including interconnecting conductors for power and signal transmission for controlling respective electronic, electromechanical, hydraulic, and pneumatic components of the tractor 9 and planter 7. Tractor controller 207 is configured for controlling the functions of the tractor 9 by controlling, e.g., steering, speed, braking, shifting, and other operations of the tractor, which may include controlling various GPS steering or other GPS-related systems, transmission, engine, hydraulic, and/or other systems of the tractor 9. A tractor interface system 215 is operably connected to the tractor controller 207 and includes a monitor and various input devices to allow an operator to see the statuses and to control various operations of the tractor 9 from within the cab of the tractor 9. The tractor interface system 215 may be a Multi-Control Armrest™ console available for use with the Maxxum™ series tractors from Case IH.

Still referring to FIGS. 3 and 13, planter controller 211 is configured for controlling the functions of planter 7 by controlling, e.g., product conveyance along the planter 7, seed 17 delivery selection, and seed delivery out of planter 7 to the field. This may include controlling the positive pressure and vacuum pumps and/or other vacuum sources, as well as fans, blowers, of seed conveyance and seed meter airflow systems 27, 28, as well as controlling other characteristics of seed meter 35 such as adjusting singulator and baffle settings by way of controlling corresponding solenoids, stepper motors, or the like. Planter controller 211 also controls seed switching mechanism 147 to automatically block exposure or permit exposure of one(s) of the seed types 17a, 17b to seed disk 37 based on the type or variety zones VZ1, VZ2 such as by the prescription map PM (FIG. 13).

Still referring to FIGS. 3 and 13, during use of planting system 5, control system 201 can determine planter position, speed, heading, and/or other movement characteristics by way of monitoring tractor position and movement through the tractor controller 207. Tractor controller 207 may evaluate, for example, a speed input signal from a tractor speed sensor along with a GPS signal or data from tractor GPS with respect to the prescription map PM (FIG. 13). Referring again to FIG. 3, using such evaluations, control system 201 determines which row units 13 should plant which seed type(s) 17a, 17b and when, to achieve such multi-seed type planting. The planter controller 211 commands selective exposure of the respective seed types 17a, 17b to seed disk 37 by actuating seed switching mechanism 147 such as by moving doors 153, 155 to achieve multi-seed type planting according to the prescription map PM (FIG. 13).

Many changes and modifications could be made to the invention without deputing from the spirit thereof. Various components and features of the system 5, for example, components or features of the seed storage system(s), charging system(s), and seed metering system(s) can be incorporated alone or in different combinations on a planter. The scope of these changes will become apparent from the appended claims.

We claim:

1. A seed meter for planting multiple types of seed in a single planting pass during row-crop planting of an agricultural field, the seed meter comprising:
   a housing arranged at a row unit of a planter and defining an enclosure that surrounds a housing cavity;
   a seed disk arranged at least partially within the housing cavity and configured to singluate seeds for individual delivery onto the agricultural field while planting;
   a split sump arrangement defined within the housing cavity, the split sump arrangement providing a split sump for holding seed in multiple chambers that are configured to receive and separately hold seed of multiple types inside the housing cavity; and
   a seed switching mechanism arranged between the split sump arrangement and the seed disk for selectively exposing one of the multiple chambers to the seed disk, the seed switching mechanism including multiple doors that correspond in number to the multiple chambers; wherein each of the multiple doors:
   includes an inner end toward a central segment of the meter housing and an outer end toward an outer segment of the meter housing; and
   is pivotable about a respective inner end between an open and a closed position.

2. The seed meter of claim 1, wherein the seeds of the multiple types in the multiple chambers respectively define multiple seed pools that are maintained inside the housing cavity while planting.

3. The seed meter of claim 1, wherein the multiple doors include at least a first door and a second door in face-to-face sliding engagement with each other.

4. The seed meter of claim 1, further comprising an actuator system for moving the first and second doors, and wherein the actuator system moves the first and second doors in an overlapping position with respect to each other to a first position to expose a first one of the multiple chambers to the seed disk to allow the seed disk to pick up seeds from the first chamber and in an overlapping position with respect to each other to a second position to expose a second one of the multiple chambers to the seed disk to allow the seed disk to pick up seeds from the second chamber.

5. The seed meter of claim 4, wherein the actuator system moves the first and second doors in unison with each other while moving the first and second doors to the first and second positions for respectively exposing the first and second ones of the multiple chambers to the seed disk.

6. The seed meter of claim 4, wherein the first and second chambers define first and second sump chambers and the split sump arrangement further includes an exposure chamber arranged between the first and second doors and the seed disk to selectively receive seeds from the first and second sump chambers, and wherein the actuator system can move the first and second doors apart from each other to block exposure of both of the first and second sump chambers to the exposure chamber to prevent the further delivery of seeds from the first and second sump chambers to the exposure chamber while the seed disk continues picking up seeds from the exposure chamber.

7. A seed meter for planting multiple types of seed in a single planting pass during row-crop planting of an agricultural field, the seed meter comprising:
   a housing arranged at a row unit of a planter and defining an enclosure that surrounds a housing cavity;
   a seed disk arranged at least partially within the housing cavity and configured to singluate seeds for individual delivery onto the agricultural field while planting;
   a split sump arrangement defined within the housing cavity, the split sump arrangement providing a split sump for holding seed in multiple chambers that are configured to receive and separately hold seed of multiple types inside the housing cavity; and
   a seed switching mechanism arranged between the split sump arrangement and the seed disk for selectively exposing one of the multiple chambers to the seed disk; wherein:
   the seed switching mechanism comprises a door assembly configured to move to multiple positions to selectively expose one of the multiple chambers to the seed disk;
   the door assembly comprises multiple doors that correspond in number to the multiple chambers so that each of the multiple chambers has a corresponding door;
   each of the multiple doors includes an inner end toward a central segment of the meter housing and an outer end toward an outer segment of the meter housing; and each of the multiple doors moves between the open and closed positions by pivoting about the respective inner end.

8. The seed meter of claim 7, further comprising a fastener and wherein each of the multiple doors pivots about the fastener.

9. A seed meter for planting multiple types of seed in a single planting pass during row-crop planting of an agricultural field, the seed meter comprising:
    a housing arranged at a row unit of a planter and defining an enclosure that surrounds a housing cavity;
    a seed disk arranged at least partially within the housing cavity and configured to singluate seeds for individual delivery onto the agricultural field while planting;
    a split sump arrangement defined within the housing cavity, the split sump arrangement providing a split sump for holding seed in multiple chambers that are configured to receive and separately hold seed of multiple types inside the housing cavity; and
    a seed switching mechanism arranged between the split sump arrangement and the seed disk for selectively exposing one of the multiple chambers to the seed disk:
wherein:
    the seed switching mechanism comprises a door assembly configured to move to multiple positions to selectively expose one of the multiple chambers the seed disk;
    the door assembly comprises multiple doors that correspond in number to the multiple chambers so that each of the multiple chambers has a corresponding door;
    each of the multiple doors includes an inner end toward a central segment of the meter housing and an outer end toward an outer segment of the meter housing; and
    each of the multiple doors includes a door tab at the outer end for engaging an actuator to move the respective door.

10. The seed meter of claim 9 wherein each of the door tabs extends through the housing so that at least a portion of each of the door tabs is spaced from the housing cavity.

11. The seed meter of claim 10, wherein each door includes a door body and the door tab of a first one of the multiple doors that extends along a straight line from the outer end of the door body of the first door.

12. The seed meter of claim 11, wherein a second one of the multiple doors includes a bracket that connects the tab to the respective door body so that the door tab and door body are transversely offset with respect to each other.

13. A seed meter for planting multiple types of seed in a single planting pass during row-crop planting of an agricultural field, the seed meter comprising:
    a housing arranged at a row unit of a planter and defining an enclosure that surrounds a housing cavity;
    a seed disk arranged at least partially within the housing cavity and configured to singluate seeds for individual delivery onto the agricultural field while planting;
    a split sump arrangement defined within the housing cavity, the split sump arrangement providing a split sump for holding seed in multiple chambers that are configured to receive and separately hold seed of multiple types inside the housing cavity; and
    a seed switching mechanism arranged between the split sump arrangement and the seed disk for selectively exposing one of the multiple chambers to the seed disk;
wherein:
    the split sump arrangement includes a sump insert comprising:
    a faceplate arranged parallel to the seed disk;
    first and second doorways arranged in the faceplate that define respective plate openings that extend through the faceplate; and
    a divider wall extending perpendicularly from the faceplate between the first and second doorways; and
the divider wall provides a barrier between the first and second chambers of the split sump arrangement and the door assembly is arranged between the first and second doorways of the faceplate and the seed disk.

14. A seed meter for planting multiple types of seed in a single planting pass during row-crop planting of an agricultural field, the seed meter comprising:
    a housing arranged at a row unit of a planter and defining an enclosure that surrounds a housing cavity and a seed inlet for receiving seeds from storage;
    a seed disk arranged at least partially within the housing cavity and configured to singluate seeds for individual delivery onto the agricultural field while planting;
    a split sump arrangement defined within the housing cavity with the split sump arrangement comprising:
    a faceplate arranged parallel to the seed disk;
    first and second doorways arranged in the faceplate that define respective plate openings that extend through the faceplate; and
    a divider wall extending perpendicularly from the faceplate between the first and second doorways through the housing cavity and the seed inlet to define a split inlet passage with first and second inlet passage segments and a split sump with first and second chambers respectively receiving seed from the first and second inlet passage segments and separately holding seeds of a first type and a second type to define first and second seed pools in the housing cavity; and
    a door assembly arranged between the split sump arrangement and the seed disk for moving to multiple positions to selectively expose the first and second seed pools to the seed disk.

15. A planter for planting seed of multiple seed types in a single planting pass during row-crop planting of an agricultural field, the planter comprising:
    a frame supporting multiple row units;
    a seed storage system for separately storing seeds of a first type and a second type on the planter;
    a seed meter arranged at each of the multiple row units with the seed meter receiving the seeds of the first and second types and delivering seeds of a selective one of the first and second types for planting an agricultural field, the seed meter comprising:
    a meter housing defining an enclosure that at least partially surrounds a seed disk configured to singluate seeds for individual delivery onto the agricultural field while planting;
    a first chamber arranged in the meter housing that receives the seeds of the first type to define a first seed pool in the first chamber selectively exposed to the seed disk;
    a second chamber arranged in the meter housing that receives the seeds of the second type to define a second seed pool in the second chamber selectively exposed to the seed disk;
    a first door arranged between the first chamber and the seed disk with the first door movable between an open position that exposes the first seed pool to the seed disk and a closed position that provides a barrier between the first seed pool and the seed disk; and
    a second door arranged between the second chamber and the seed disk with the second door movable between an open position that exposes the second seed pool to the seed disk and a closed position that provides a barrier between the second seed pool and the seed disk;

wherein:
- each of the first and second doors includes an inner end toward a central segment of the meter housing and an outer end toward an outer segment of the meter housing; and
- each of the first and second doors moves between the open and closed positions by pivoting about the respective inner end.

16. The planter of claim 15, further comprising a fastener and wherein each of the first and second doors pivots about the fastener.

* * * * *